United States Patent
Harrison et al.

(10) Patent No.: US 9,247,630 B2
(45) Date of Patent: Jan. 26, 2016

(54) SURFACE-MICROMACHINED MICRO-MAGNETIC UNDULATOR

(71) Applicant: The Regents of the University of California, Oakland, CA (US)

(72) Inventors: Jere Harrison, Los Angeles, CA (US); Abhijeet Joshi, Los Angeles, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 14/355,127

(22) PCT Filed: Nov. 9, 2012

(86) PCT No.: PCT/US2012/064542
§ 371 (c)(1),
(2) Date: Apr. 29, 2014

(87) PCT Pub. No.: WO2013/112226
PCT Pub. Date: Aug. 1, 2013

(65) Prior Publication Data
US 2014/0301415 A1    Oct. 9, 2014

Related U.S. Application Data

(60) Provisional application No. 61/558,944, filed on Nov. 11, 2011.

(51) Int. Cl.
*H01S 3/00* (2006.01)
*H05H 7/04* (2006.01)
*H01S 1/00* (2006.01)
*H01S 3/0959* (2006.01)
(Continued)

(52) U.S. Cl.
CPC . *H05H 7/04* (2013.01); *H01F 7/06* (2013.01); *H01S 1/005* (2013.01); *H01S 3/0903* (2013.01); *H01S 3/0959* (2013.01)

(58) Field of Classification Search
CPC ...... H01S 1/005; H01S 3/0903; H01S 3/0959
USPC .......................................................... 372/2
See application file for complete search history.

(56) References Cited

U.S. PATENT DOCUMENTS 4,542,510 A    9/1985  Black
4,800,353 A *  1/1989  Csonka et al. ................ 335/210
(Continued)

FOREIGN PATENT DOCUMENTS

CA    1291817 C       11/1991
JP    03-205600 A      9/1991
(Continued)

OTHER PUBLICATIONS

Arnold et al., Permanent Magnets for MEMS, *Journal of Microelectromechanical Systems* 18(6):1255-1266 (2009).
(Continued)

*Primary Examiner* — Kinam Park
(74) *Attorney, Agent, or Firm* — Knobbe, Martens, Olson & Bear LLP

(57) ABSTRACT

Various embodiments of undulators, methods of fabricating undulators, and systems incorporating undulators are described. Certain embodiments provide a compact, electromagnetic undulator. The undulator may comprise a substrate and one or more electromagnets, which may be formed on the substrate. Certain embodiments have a period not greater than about 5 mm. The undulator may be operatively coupled with a particle accelerator to provide a free electron laser system.

21 Claims, 8 Drawing Sheets

(51) Int. Cl.
*H01S 3/09* (2006.01)
*H01F 7/06* (2006.01)

(56) References Cited

U.S. PATENT DOCUMENTS

| | | | |
|---|---|---|---|
| 5,268,693 A * | 12/1993 | Walsh | 372/74 |
| 5,544,181 A | 8/1996 | Krishnaswamy et al. | |
| 8,369,911 B2 | 2/2013 | Moser et al. | |
| 2006/0216940 A1* | 9/2006 | Gorrell et al. | 438/706 |
| 2009/0314949 A1 | 12/2009 | Plettner et al. | |

FOREIGN PATENT DOCUMENTS

| | | |
|---|---|---|
| JP | 04-130300 A | 5/1992 |
| JP | 06-275428 A | 9/1994 |
| JP | 08-064398 A | 3/1996 |

OTHER PUBLICATIONS

Ding et al., Measurements and Simulations of Ultralow Emittance and Ultrashort Electron Beams in the Linac Coherent Light Source, *Physical Review Letters* 102:254801-1 to 4 (2009).

Granatstein et al., Small-period electromagnet wigglers for free-electron lasers, *Appl. Phys. Lett.* 47(6):643-645 (1985).

Paulson, Micro-Undulator Research at UCSB, *Nucl. Instrum. Meth. A296*, 624 (1990).

Plettner et al., Photonic-based laser driven electron beam deflection and focusing structures, *Phys. Rev. ST Accel. Beams* 12:101302-1 to 9 (2009).

Ramian et al., Micro-undulator FELs, *Nucl. Instrum. Meth. A250*, 125-133 (1986).

Tatchyn et al., Attainment of submillimeter periods and a 0.3-T peak field in a novel micropole undulator device, *Appl. Phys. Lett.* 50(7):377-379 (1987).

Tatchyn et al., Generation of Soft X-Ray/VUV Photons with a Hybrid/Bias Micropole Undulator on the LLNL Linac, *Journal of X-Ray Science and Technology* 1:79-98 (1989).

Tatchyn et al., Perspectives on micropole undulators in synchrotron radiation technology, *Rev. Sci. Instrum.* 60(7):1796-1804 (1989).

International Search Report and Written Opinion dated Aug. 27, 2013, for Application No. PCT/US2012/064542, 10 pages.

* cited by examiner

US 9,247,630 B2

SURFACE-MICROMACHINED MICRO-MAGNETIC UNDULATOR

CROSS-REFERENCE TO RELATED APPLICATIONS

This application is a U.S. National Phase of International Application No. PCT/US2012/064542, filed Nov. 9, 2012, which claims priority from U.S. Patent Application No. 61/558,944, filed Nov. 11, 2011, the contents of which are incorporated herein by reference in their entirety.

STATEMENT REGARDING FEDERALLY SPONSORED R&D

This invention was made with Government support under N660001-12-1-4209, awarded by the Space and Naval Warfare Systems Command. The Government has certain rights in the invention.

PARTIES OF JOINT RESEARCH AGREEMENT

Not applicable.

BACKGROUND OF THE INVENTION

1. Field of the Invention

The present invention relates to an undulator for use with a free-electron laser system, and in particular, to an electromagnetic undulator and processes for fabricating the same.

2. Description of the Related Art

Conventional devices used for the decelerator/interaction region of a collimated X-Ray free electron laser (FEL) typically rely on chains of opposing permanent magnets with 1 cm to 10 cm characteristic length scales to extract keV energy photons from GeV (Gigaelectron volt) energy electrons. Such conventional undulators permit only a few 10s of periods of the undulator in a device that is several meters long. Further, the intense fields developed by the close spacing of 1 T to 10 T permanent magnets in conventional permanent magnet undulators generate enormous forces that require significant structural support. Such structural support may result in undulators that occupy a volume of greater than one cubic meter, and may weigh more than 10,000 kg. Further, the magnetic fields tend to be non-uniform. In certain conventional implementations, to achieve very large controllable and uniform fields, superconducting magnets are often used, requiring cryogenic cooling and ancillary support hardware. Such types of undulators are too large, heavy, and expensive for many types of applications.

Certain other undulator designs use expensive, hand assembled 100 micron scale wax-bound powder permanent magnets, magnetic fields induced by a high power laser, or betatron oscillators which use laser-plasma Wakefield accelerators to extract MeV energy photons from GeV energy electrons.

Conventional wax-bound hard micro-magnets typically have not been scaled below 100 microns, must be hand assembled, and have poor field uniformity due to limitations in the NiFeB microstructural grain size, the magnetic domain size, and thermal stability of the material.

Further, conventional laser-driven undulators may require very high intensity (100 TW/m$^2$) to achieve 1 T magnetic fields in free space or intricate waveguide structures to control the light. Additionally, in order to achieve high intensities, conventional laser-driven undulators typically require a great deal of specialized optics, ancillary electronics, power, and space in order to focus a 1 kW 10.6 micron laser or the like.

Similar intensities may also be realized by micro-fabricated off-axis illuminated periodic cavities used as advanced deflection structures, but such structures are very challenging to implement and so tend to be impractical for typical applications.

Betatron oscillations in a laser-plasma Wakefield accelerator have been used for the undulating field, but conventionally cannot produce a sufficiently narrow spectral output. Further, filtering the laser spectrum from the 36% bandwidth, typical of betatron sources, to 0.1% bandwidth may reduce the brightness by 99.7%.

While the foregoing conventional undulators may have certain characteristics that are improvements over sintered ceramic permanent magnets, they do not present an adequate path for future scaling.

SUMMARY OF THE INVENTION

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Various embodiments of undulators, methods of fabricating undulators, and systems of undulators are described.

Certain embodiments provide a low-powered undulator, which may be in the form of a micromachined soft-magnetic undulator. Certain embodiments of the undulator provide for substantially monochromatic emission. Certain embodiments may utilize a relatively low-energy electron beam source. Certain embodiments may be widely tunable with respect to their undulator parameters and/or electron beam characteristics.

Certain embodiments provide an undulator with a relatively enhanced current density via a low thermal path including a substrate and optionally a metal base layer. Certain embodiments present relatively low induction to a driving circuit, enabling the undulator to be pulsed with a relatively short duty cycle, without causing unacceptable electromagnetic interference.

An example undulator fabrication process forms undulator features using photolithography and/or electroforming.

An example embodiment provides an electromagnetic undulator, comprising: a substrate; a plurality of electromagnets formed on the substrate, wherein the electromagnetic undulator has a period not greater than about 5 mm and not less than about 5 μm. Optionally, the undulator includes a yoke having a thickness and a yoke gap, wherein the ratio of the yoke gap to the yoke thickness is less than or equal to 10:1. Optionally, the electromagnetic undulator has a period in the range of about 10 μm to about 100 μm. Optionally, the electromagnetic undulator has a period in the range of about 100 μm to about 200 μm. Optionally, the electromagnetic undulator has a period in the range of about 300 μm to about 400 μm. Optionally, the electromagnetic undulator has a period in the range of about 400 μm to about 800 μm. Optionally, the electromagnetic undulator further comprises metal windings. Optionally, the electromagnetic undulator further comprises surface-micromachined solenoidal soft micro-magnets. Optionally, the electromagnetic undulator has an optical wavelength and output power tunable over a plurality of orders of magnitude by selectively changing drive current in one or more electromagnetic undulator yoke windings. Optionally, the electromagnetic undulator is configured to generate a magnetic flux on only one side of an undulator axis. Optionally, the electromagnetic undulator does not require cryogenic cooling for operation with a particle accelerator.

An example embodiment provides a method of fabricating an electromagnetic undulator, the method comprising: defining a pattern for bottom coil windings on a substrate; depositing an insulating layer over the substrate; depositing a seed layer; electroplating a magnetic alloy layer over the seed layer to form an electromagnetic yoke; forming a photoresist layer over the electromagnetic yoke; patterning the photoresist layer to define coil winding interconnects; and electroplating metal over the coil winding interconnects to form, at least in part, electromagnet coil windings. Optionally, a damascene process is used in forming the electromagnet coil windings. Optionally, at least a portion of the seed layer is stripped. Optionally, the seed layer comprises copper and titanium. Optionally, the magnetic alloy comprises NiFe, CoNiFe, or CoNiP. Optionally, the electromagnetic undulator has a period in the range of about 5 μm to about 5 mm. Optionally, the electromagnetic yoke has an associated gap in the range of about 10 μm-100 μm across.

An example embodiment provides a free electron laser system, comprising: a particle accelerator; an electromagnetic undulator in operative arrangement with the particle accelerator, the electromagnetic undulator comprising: a substrate; a plurality of electromagnets formed on the substrate, wherein the electromagnetic undulator has a period not greater than about 5 mm and not less than about 5 μm. Optionally, the particle accelerator has a length in the range of 2 cm to 10 cm. Optionally, the particle accelerator has an output no greater than 500 MeV. Optionally, the particle accelerator is a laser-plasma Wakefield accelerator.

BRIEF DESCRIPTION OF THE DRAWINGS

Certain disclosed aspects will hereinafter be described in conjunction with the appended drawings, provided to illustrate and not to limit the disclosed aspects, wherein like designations denote the elements.

DETAILED DESCRIPTION OF PREFERRED EMBODIMENTS

Figure 1:
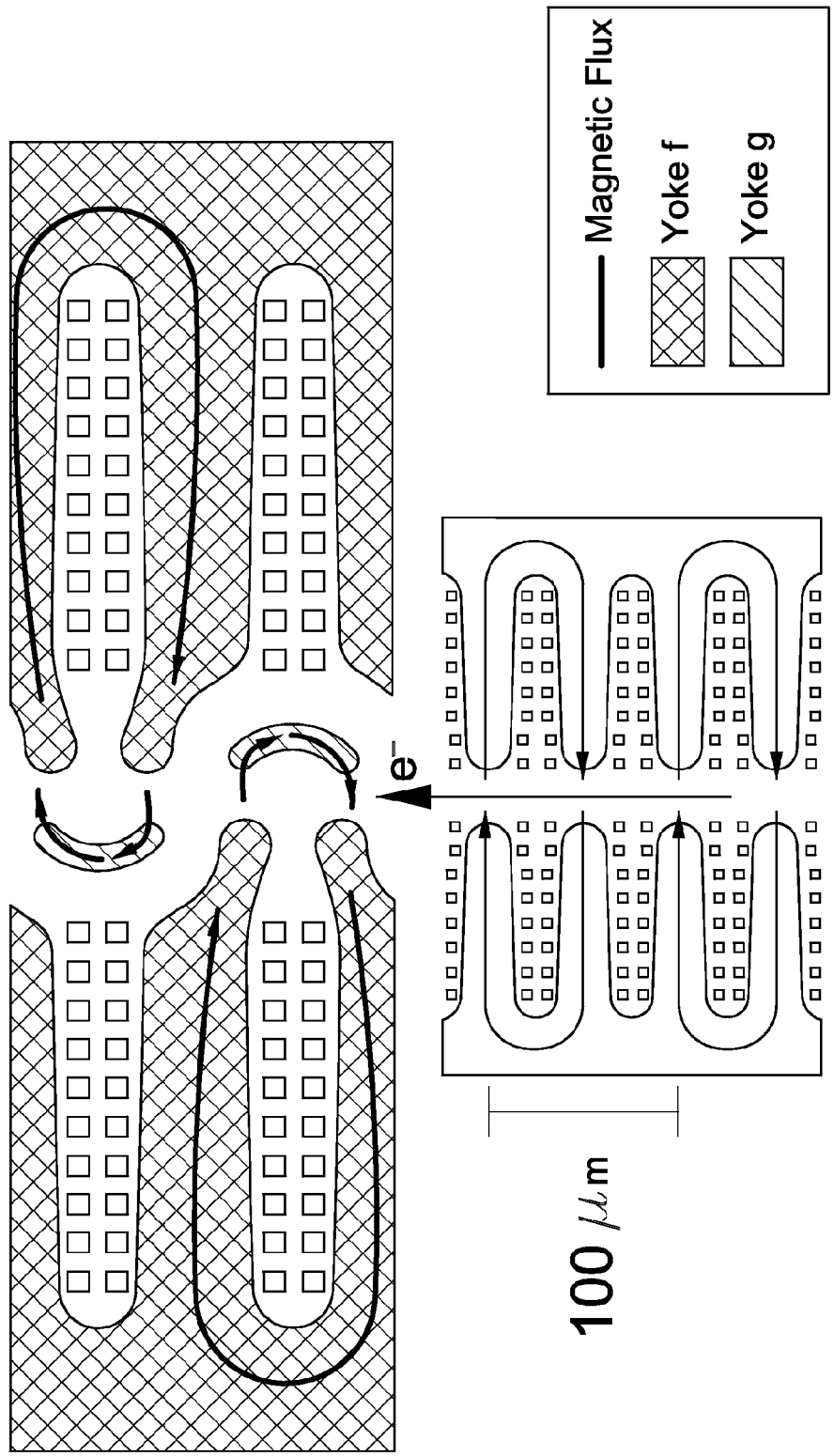
FIG. 1 illustrates example embodiments of an undulator.

As is well known, free electron lasers (FEL) use a relativistic electron beam as the lasing medium which moves through a magnetic structure. In particular, in a FEL, a beam of electrons is accelerated to almost the speed of light. The beam passes through an oscillator/undulator (sometimes referred to as a "wiggler"), which generates a periodic transverse magnetic field using an arrangement of magnets with alternating poles within an optical cavity along the electron beam path. The undulator may cause, at least in part, the beam electrons to follow a sinusoidal path.

However, as discussed above, conventional undulators suffer from many deficiencies, including size, weight, power requirements, difficulty of manufacturer, insufficiently narrow spectral output, etc. Some or all of these deficiencies are overcome by certain embodiments described herein.

Certain embodiments provide a compact, low-powered micromachined undulator, which may be a soft-magnetic undulator having an actively powered wound induction coil, which forms an electromagnet. Certain embodiments may be actively powered using a driver, such as a current driver. Certain embodiments are highly efficient as compared with many conventional designs. For example, in certain example embodiments, the power consumed may be less than about 5 W/(cm of undulator length).

As discussed in greater detail below, certain embodiments may be fabricated using photolithography and/or electroforming techniques. Certain embodiments may be formed using a substrate. For example, a silicon substrate may be utilized, particularly for price sensitive applications. However, other substrates, such as copper or sapphire may be used, which may have enhanced characteristics (e.g., higher thermal conductivity in the case of copper, improved electrical insulation properties in the case of sapphire, preventing or reducing stray currents from spreading to nearby circuit elements). Certain embodiments may be utilized with FELs operating in the terahertz to gamma ray range. For example, certain embodiments of the undulators described herein may be utilized with respect to an FEL, such as a collimated X-Ray FEL, an Ultra-violet (UV) FEL, or a microwave FEL. Certain embodiments may be utilized to produce high-average-power, high energy undulator radiation and/or to provide FEL amplification.

As compared to certain conventional approaches, scaling the undulator structure down to μm-size allows better control over magnetic field distribution, removing or reducing emission of unwanted wavelengths, and enabling a lower electron beam energy while maintaining high-energy output. Significant scaling reductions in the undulator period, while maintaining high magnetic field intensity in the undulator, is achieved in certain embodiments utilizing surface-micromachined solenoidal soft micro-electromagnets.

Air-gap electromagnet structures for certain example undulators may be as small as 10 microns (or smaller) and may have thicknesses as great as 100 microns (or greater), enabling a strong and uniform field. As will be described in greater detail below, certain embodiments utilize an electrodeposition processes to provide enhanced permeability and saturation magnetization of a thin film magnetic media (e.g., in an NiFe, NiFeP, or NiFeB material system).

Historically, many obstacles have prevented soft-magnet microelectro-mechanical system (MEMS) devices from achieving widespread use. The complex fabrication process needed to produce integrated 3D coils has limited typical devices to space-inefficient planar coils or external magnetic flux sources, two options that would inhibit the scaling of micro-fabricated undulator period length to the sub-mm level. Further, depositing high-quality magnetic films thicker than 10 μm requires expertise in electrochemistry and controlled atmosphere tools, a significant barrier to entry in the field. Additionally, the micro-fabrication necessitates an assortment of cleanroom fabrication tools and significant experience. Thick magnetic film devices, in particular, use atypical processes such as thick photoresist electroplating molds and photolithography over high aspect-ratio topology. Thus, small dimensioned, soft magnet undulators, such as those disclosed herein, have not previously been implemented.

Due to its compact size, and in contrast to the large scale permanent magnet undulators described above, certain embodiments of the surface micro-machined undulator described herein fit the length scale, and may be utilized with compact GeV accelerators (e.g., having lengths on the order of 2 cm-10 cm), such as a 3.3 cm long laser Wakefield accelerator or other accelerator designs having a length of the same order of magnitude (e.g., 1 cm to 10 cm long). Of course certain embodiments of the undulator may be utilized with larger accelerators, such as a meter long or a several meters long accelerator.

For example, certain compact embodiments of the undulator provide a period within the range of about 5 μm to about 5 mm. Certain compact embodiments of the undulator provide a period of no greater than 1 mm. Certain embodiments provide a period within the range of about 10 μm to about 1 mm. Certain embodiments provide a period within the range of about 12.5 μm to about 1 mm. Certain embodiments provide a period within the range of about 10 μm to about 700 μm. Certain embodiments provide a period within the range of about 10 μm to about 100 μm. Certain embodiments provide a period within the range of about 5 μm to about 100 μm. Certain embodiments provide a period within the range of about 100 μm to about 400 μm. Certain embodiments provide a period within the range of about 300 μm to about 400 μm. Certain embodiments provide a period within the range of about 400 μm to about 800 μm. Other periods may be used as well.

The undulator period length may have a lower bound based at least in part on the resolution of the thick photoresist mold used in the magnetic yoke fabrication process, and may have an upper bound based at least in part on the size of the silicon wafer used in fabrication. Given the compact nature of certain embodiments of the undulator, for an undulator having a period of about 10 μm, an undulator with 100 periods may have a dimension of about 1 mm (number of periods×period dimension). For an undulator having a period of about 1 mm, an undulator with 100 periods may have a dimension of about 10 cm. By contrast, many conventional undulators may permit only 10 to 20 periods of the undulator in a device that is several meters long.

As noted above, certain embodiments include a soft-magnet undulator having an actively powered coil producing magnetomotive force (MMF) to generate magnetic flux. Optionally, a magnetic yoke (sometimes referred to as a magnetic core) may be fabricated to direct the flux across the undulator gap, and engineered magnetic pole tips may be fabricated to concentrate the magnetic flux density. The gap may be about 50 μm across, about 25 μm-50 μm across, in the range of 10 μm-100 μmm across, or in the range of 10 μm-400 μm across. The gap may be sized to be 1.5× the radiation wavelength of the particle beam. In certain embodiments, the maximum field that can be generated may be limited by the saturation magnetization of the magnetic yoke (e.g., 2.1 T for certain electroplated alloys of CoNiFe and CoNiP). In certain embodiments, peak flux densities may be limited, in part, by the magnetic flux that fringes across the yoke before reaching the undulator gap. For example, peak flux densities may range from 100 mT to over 1 T in the gap, depending on the design.

Certain embodiments optionally include a high aspect ratio (e.g., at least 100:1 sidewall slope) thick (e.g., 10 μm to 100 μm) electroformed magnetic film, which may provide fields across transverse cross sections that are large enough to accommodate conventionally available electron beams.

Certain embodiments will now be discussed with reference to the figures. Referring to FIG. 1, certain embodiments may utilize a horseshoe or "u" racetrack shaped solenoidal coil, although other shapes and configurations may be used. In particular, FIG. 1 illustrates a two period cross section of two undulator designs with period $\lambda_u$ of about 100 μm. Design 1 facilitates further scaling. As illustrated, the undulator of Design 1 includes yokes f and yokes g (opposing corresponding yokes f). Winding interconnect cross sections are also illustrated. Flux paths are indicated by the arrowed magnetic flux path overlays.

Figure 2A:
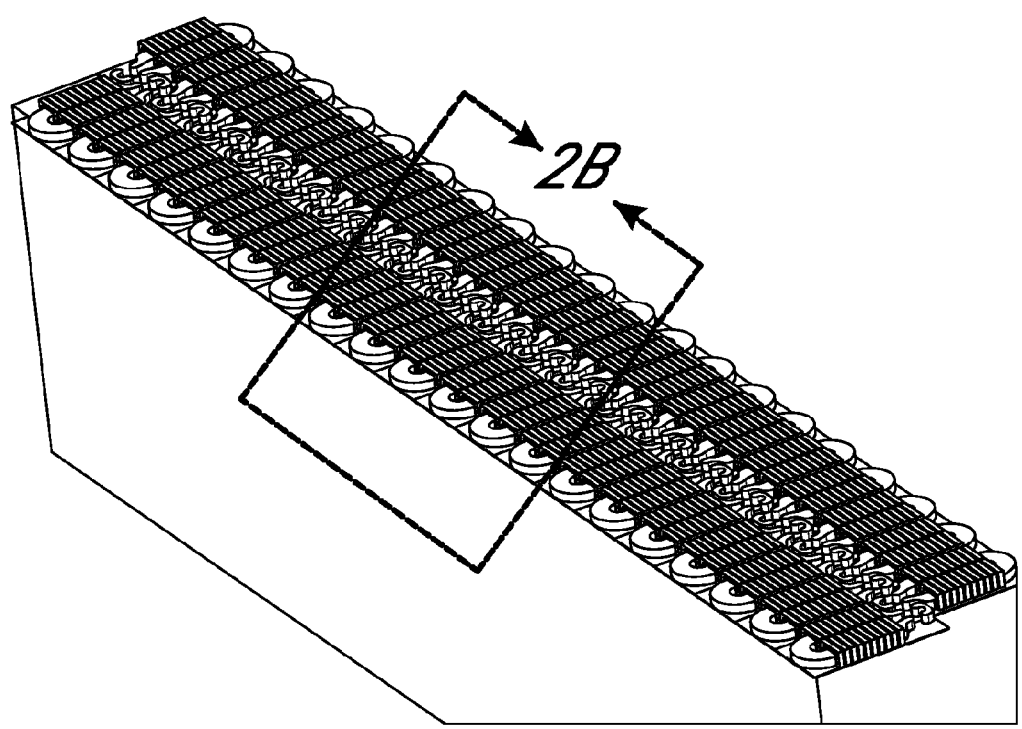
FIG. 2A illustrates an example micro-undulator on a substrate.
Figure 2B:
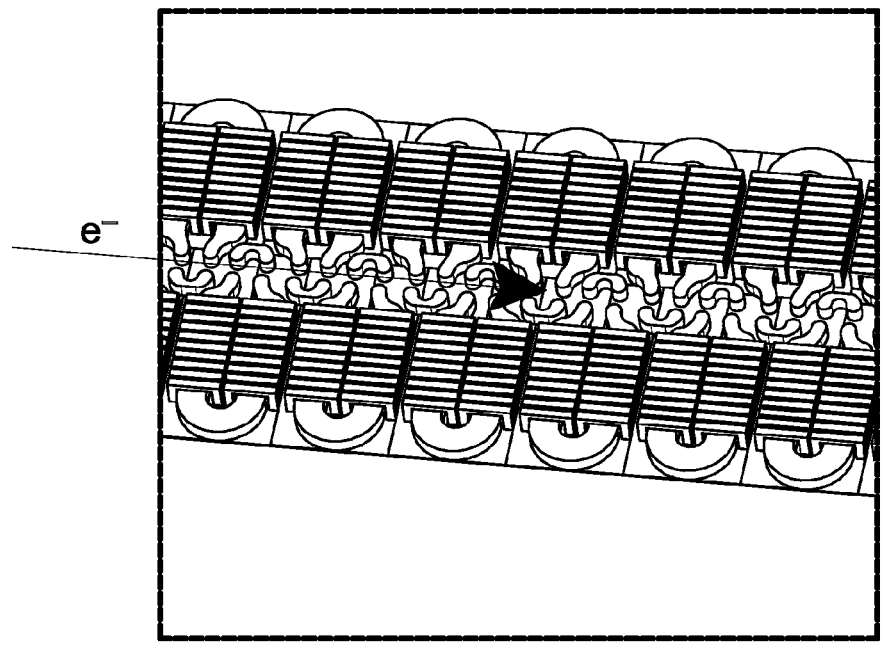
FIG. 2B illustrates an example undulator, including several periods of an undulator structure.

FIG. 2A illustrates an example micro-undulator on a silicon substrate using Design 1 of FIG. 1. FIG. 2B illustrates several periods of an undulator structure, showing the coils wrapped around the yokes. The use of 3D coils, as compared to 2D planar coils, enables more windings to be packed into a smaller area on the surface of the undulator substrate, enabling a practical short-period electromagnetic undulator. By way of example, there may be 2 to 32 windings around each yoke, although more or fewer windings may be used. In certain example embodiments, there may be 4 windings on each yoke (which may be desirable when the gap dimension is comparable to the undulator period) coming back from a pole tip, and therefore 16 windings per period. In certain embodiments, it may be desirable to increase the number of windings with a decreased gap dimension to enhance efficiency. The "racetrack" solenoidal coils illustrated in FIGS. 1, 2A and 2B are an area-efficient design that fits the windings and yoke f into a relatively long and narrow space, which is desirable for short period undulators. The solenoidal coil designs of FIG. 1 can fit an order of magnitude or more coil windings into a given surface area than conventional, simpler and more common planar MEMS coil designs.

For a single electromagnetic undulator period with a high permeability magnetic yoke, the fraction of generated magnetic flux that is channeled into the undulator gap is a function, at least in part, of the reluctance of the magnetic path across the gap relative to the magnetic reluctance of other return paths in parallel. Therefore, certain embodiments reduce or minimize the reluctance of the desired path and enhance or maximize the reluctance of other paths by reducing the length of the yoke to an optimized distance, balancing the area needs of the windings against the flux losses per length of yoke, and tapering the yoke cross section to reduce the desired flux path reluctance and accommodate flux losses toward the pole tip.

Referring to the first design embodiment (Design 1) illustrated in FIG. 1, the illustrated design generates the magnetic flux on one side of the undulator. Directing the flux through MMF sources located only on one side of the undulator axis to a short yoke on the other side allows doubling the yoke width and spacing for a given undulator period length. However, this design may result in relatively more parasitic magnetic fringing between the short yokes.

Referring to the second design embodiment (Design 2) illustrated in FIG. 1, the illustrated design generates the magnetic flux on both sides of the undulator axis. Directing the flux through MMF sources on both sides of the undulator axis results in relatively less parasitic magnetic fringing between the short yokes (as compared to directing the flux through MMF sources located only on one side of the undulator axis) and so may achieve a larger peak magnetic field. Rounded edges may be used in the yoke configuration to reduce fringing loses.

Because certain embodiments are actively powered (e.g., using a current driver), the undulator magnetic field may be manipulated by modulating the driving current. For example, by pulsing the current rapidly (e.g., τ=10 ns-10 μs), the undulator field may be rapidly tuned, facilitating modulation of the light beam, automated tuning of the field uniformity, and arbitrary field strength tapering of the undulator. Optionally the undulator coils may be selectively powered. Thus, for example, to change the optical power and/or output power, only a portion of the coils may be powered (e.g., every other coil, and third coil, etc.) or different coils may be driven with different amounts of current. Coils can be powered together in subsets. For example, even numbered coils may be ganged and driven together, and odd numbered coils may be separately ganged and driven together, enabling just the even coils to be powered, just the odd coils to be powered, or both the even and odd coils to be powered. Of course other subsets may be ganged and driven together. The undulator may also be tuned by changing the electron input energy to the undulator.

An example undulator will now be discussed with references to example characteristics, however other characteristics may be used. In this example, the undulator has the following characteristics: period $\lambda_u$=100 μm, the gap g=25 μm undulator with a 50 μm yoke, saturated with 160 A-turns off MMF. Assuming a 32 turn 0.8Ω copper coil, J=2.5×10$^{10}$ A/m$^2$ winding current density, and each 100 μm period of the undulator will dissipate about 5 W. The base of the 200 μm thick substrate needs to be maintained at a temperature below about −143° C. to keep the undulator from exceeding about 250° C. This undulator should be capable of continuous operation when sufficiently cooled (e.g., cryogenically cooled by liquid nitrogen or other coolant). Optionally, certain embodiments do not use any aluminum for the yoke coils. Because the current densities may be very high, in such embodiments, electromigration limits many metals to current densities less than 1 MA/cm$^2$ (1×10$^{10}$ A/m$^2$) or risk failure of the metal. Certain embodiments may utilize copper and/or gold for the coils, because such metals can be utilized at an order of magnitude higher current densities.

To improve the thermal performance of the undulator, the electromagnet yoke thickness may be reduced (e.g., to substantially match the size of the gap between the yoke poles). For example, if a 25 μm thick yoke is used, the base of the substrate only needs to be kept below about 41° C., and thus the undulator can operate at room temperature without the need for cryogenic cooling). To allow for reduced or no cryogenic cooling, certain embodiments have a yoke thickness that substantially matches (e.g., within a factor of ten) the yoke pole gap. Other embodiments may have a gap greater or less than 25 μm.

Certain undulator electromagnet performance characteristics are obtained as a compromise between (i) reducing the length of the racetrack yoke to reduce or minimize the fringing flux losses to thereby reduce the needed MMF for a given field and (ii) increasing the winding cross section to reduce the current density and improve heat transport.

In order to enhance the undulator geometry to provide a higher field, optionally, the undulator magnetic gap width may be reduced to $\lambda_u/4$. While this may cause the field down the undulator axis to deviate from sinusoidal uniformity, radiating power into higher order harmonics, certain embodiments correct this deviation by shaping (e.g., by increasing the radius of curvature of the poles) the magnetic pole tips. In addition, while increasing the radius of curvature of the poles may slightly reduce the peak field, it beneficially also reduces the contribution of higher order (odd) harmonics in the magnetic field. For example, increasing the radius of curvature from 12.5 μm to 32 μm reduces the third harmonic from about 11.5% of the total spectral content to about 4.6% (i.e., a greater than 50% improvement) and increases the peak of the fundamental harmonic by about 7% for a $\lambda_u$/gap ratio of 8.

For periods longer than 100 μm, tapering the yoke, as illustrated in FIG. 1, from a wide back to about a $\lambda_u/4$ width pole reduces the magnetic reluctance and spreads out the flux at the back corners of the yoke where the undulator first saturates. For example, 2D nonlinear magnetostatic FEM simulations show that a $\lambda_u$=400 μm undulator with a yoke tapering and a 50 μm wide magnetic gap produces a saturated peak field of about 1500 mT, 45% greater than the untapered yoke. The foregoing optimization may be limited by the space requirements for the electromagnet winding vias. Table I lists the approximate peak magnetic flux density achieved with a variety of optimized or enhanced undulator geometries.

TABLE I

| $\lambda_u$ (μm) | Undulator gap (μm) | Bpeak (mT) | K |
|---|---|---|---|
| 25 | 6.25 | 540 | 8.9 × 10−4 |
| 25 | 12.5 | 230 | 3.8 × 10−4 |
| 100 | 25 | 727 | 4.8 × 10−3 |
| 100 | 50 | 334 | 2.2 × 10−3 |
| 400 | 50 | 1500 | 4 × 10−2 |
| 400 | 100 | 970 | 2.6 × 10−2 |

The strength of the coupling between the radiation and the relativistic beam is related to the normalized undulator parameter, K. As follows:

$$K = (eB_{peak}\lambda_u)/(2\sqrt{2}\Pi m_e c)$$

where e is the charge of an electron, Bpeak is the peak on-axis transverse magnetic field, $\lambda_u$ is the undulator period, $m_e$ is the electron mass, and c is the speed of light. In this example, the achievable undulator parameter in the range of about $\lambda_u$=25 μm to $\lambda_u$=1 mm scales between K=9×10$^{-4}$ and K=0.1.

Figure 5:
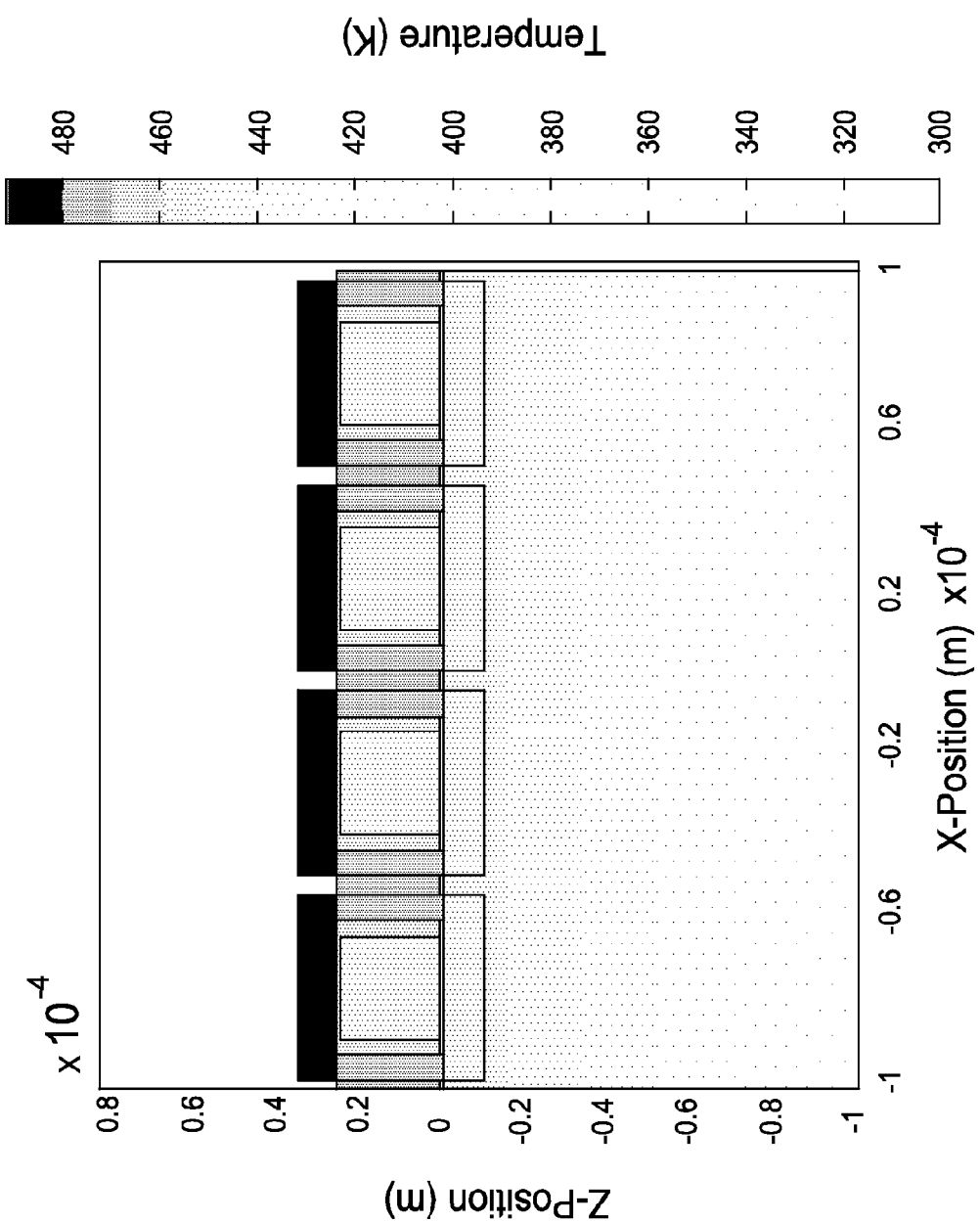
FIG. 5 illustrates an example undulator temperature distribution when driven with a second drive current.
Figure 6:
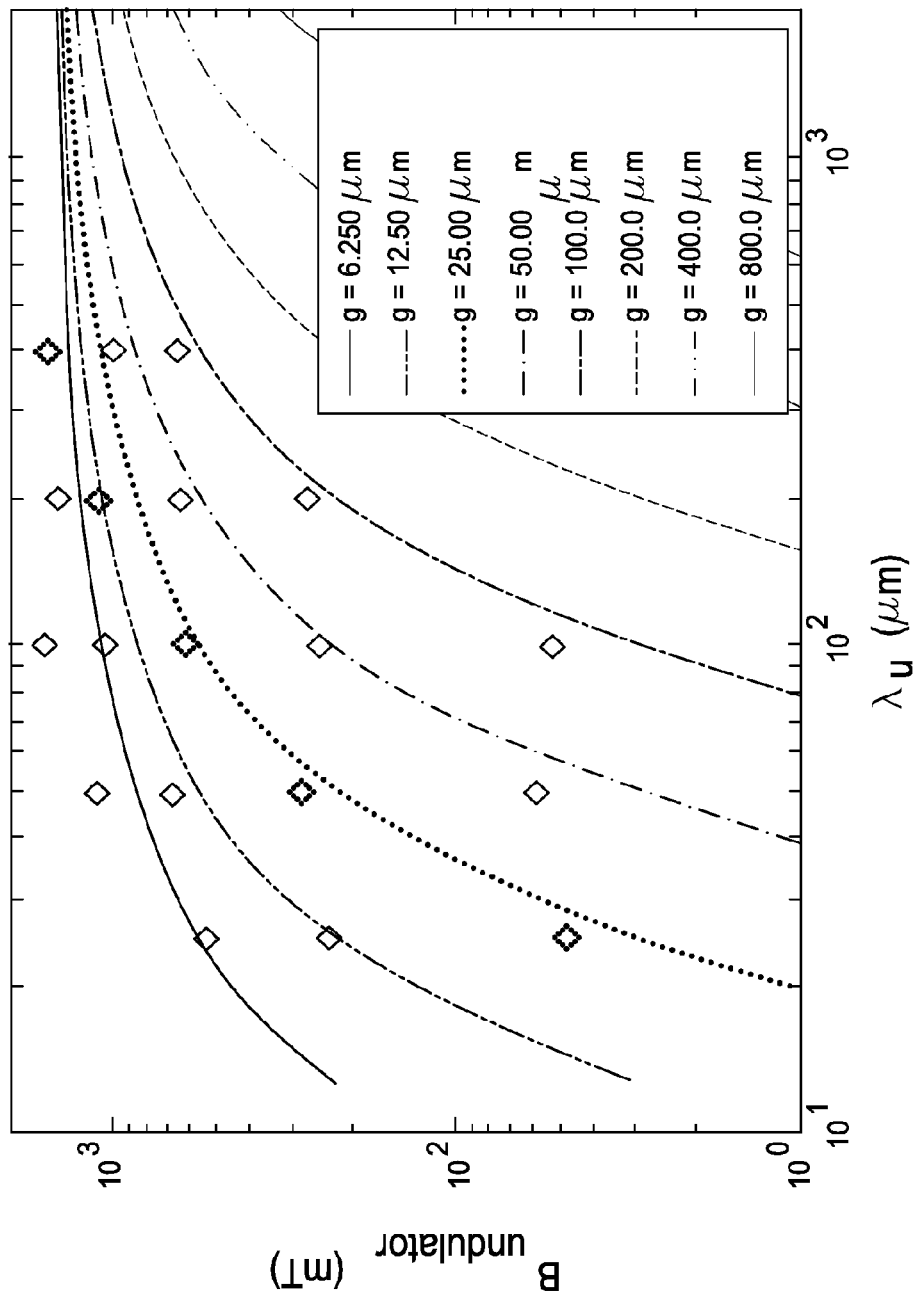
FIG. 6 illustrates an example undulator magnetic flux density plot.

FIG. 6 illustrates the calculated and simulated magnetic flux density of the Design 2 undulator, as illustrated in FIG. 1, plotted at saturation, varying the undulator period and gap. In particular, FIG. 5 plots the scaling of the transverse magnetic flux density in the center of the undulator versus gap and period. In this example, the flux path length and the yoke width equal the period $\lambda_u/4$, and a saturation $B_{sat}$=2.1 T is used. When the geometric parameters are scaled together, the peak magnetic flux density remains constant. To verify the analytical scaling law, a variety of undulator geometries were simulated using the 2D FEM magnetostatic package in COMSOL MULTIPHYSICS with a nonlinear CoNiFe material model derived from vibrating sample magnetometry studies of electroplated $Ni_{80}Fe_{20}$ samples with scaled saturation magnetization and initial permeability.

Analytical results approximate the simulated fields well for relatively small ratio of period to gap (e.g., 1≤λu/g≤8), because the relatively short fringing paths across the window may be neglected.

Figure 7:
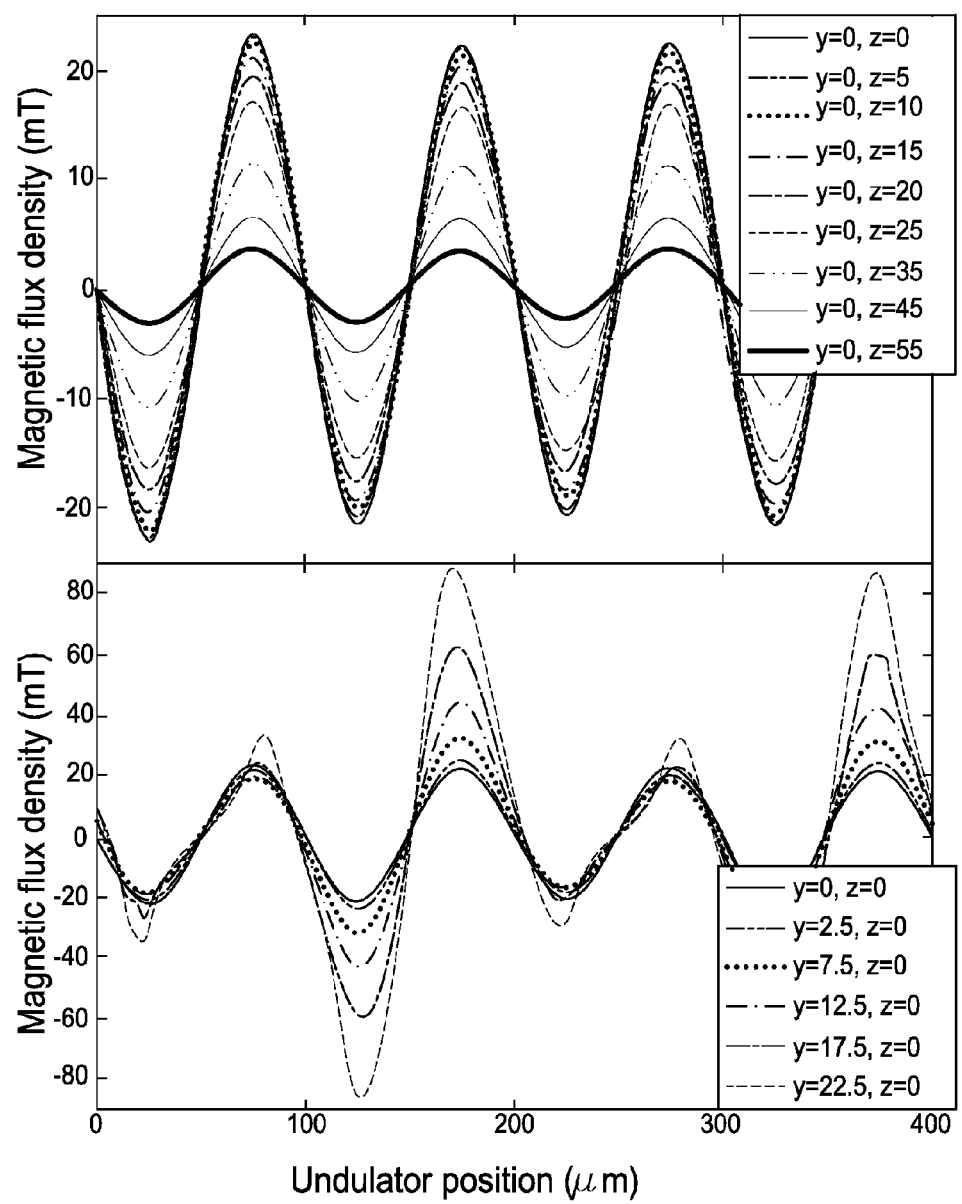
FIG. 7 illustrates an example transverse magnetic flux density plot for a first undulator implementation.
Figure 8:
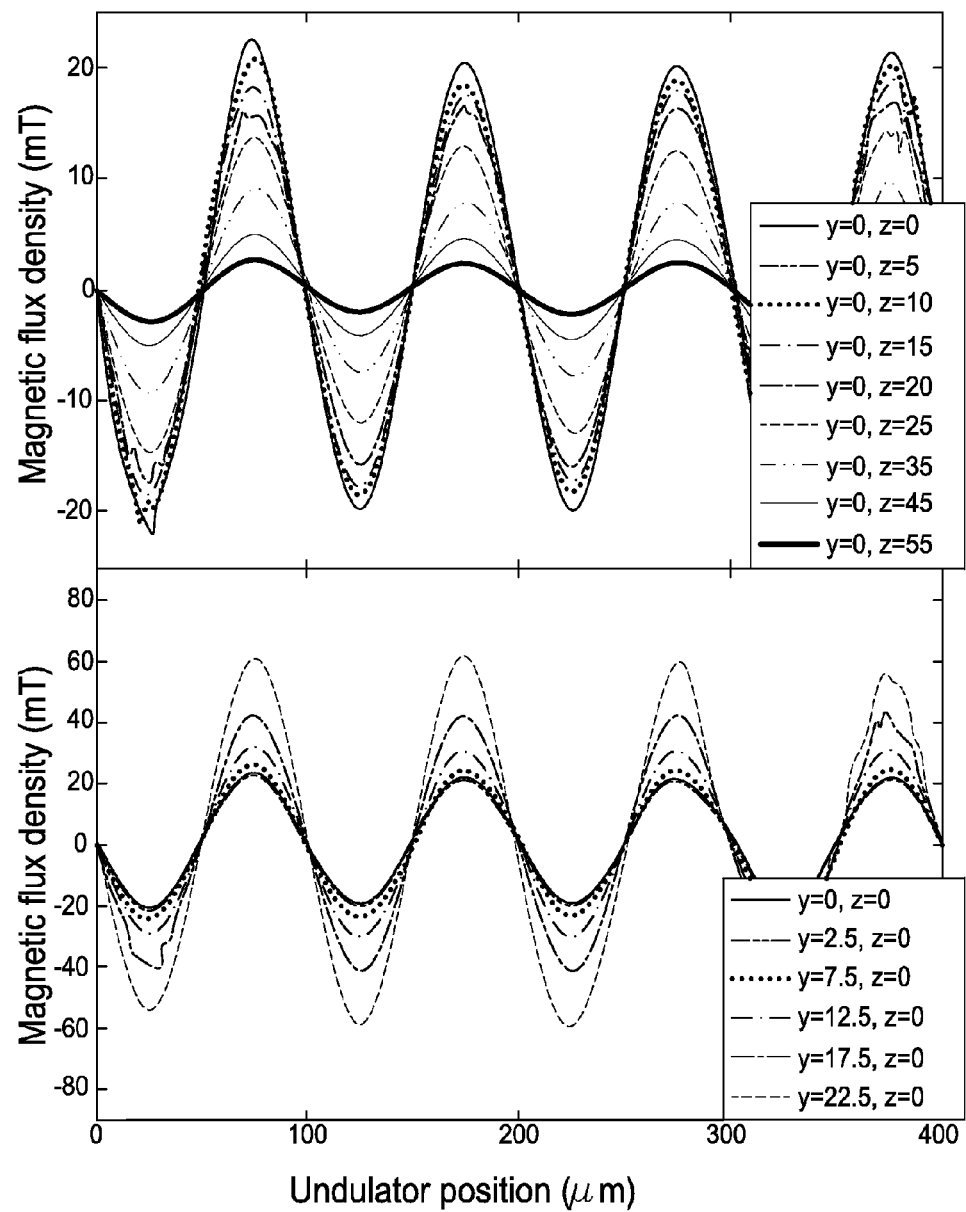
FIG. 8 illustrates an example transverse magnetic flux density plot for a second undulator implementation.

The magnetic field uniformity will now be described. The low K value of certain example embodiments of the undulators implies that magnetic field nonuniformity has a relatively small effect on the undulator resonance condition. However, beam position and focusing may be more sensitive to the magnetic field profile because the electron beam occupies much of the space between the magnetic pole tips. 3D magnetostatic FEM simulations of the field in a 100 μm period, 50 μm×50 μm gap undulator were performed with Comsol Multiphysics to visualize the transverse behavior of the field. FIGS. 7 and 8 illustrate the transverse magnetic flux density at different positions in the example undulator Designs 1 and 2 of FIG. 1, respectively. The z dependence of the magnetic field seen in both designs may be explained by the fact that out-of-plane magnetic fringing reduces the transverse magnetic flux density away from the center of the undulator. Conversely, in the undulator plane (along the y direction), the magnetic flux is larger as the magnetic flux sources are approached. This effect is more pronounced in Design 1, where the flux source is only on one side, as can be seen from the plot illustrated in FIG. 7.

With respect to FIG. 7, the transverse magnetic flux density is plotted at different positions for Design 1 of FIG. 1, with period $\lambda_u=100$ μm, and gap g=50 μm. The plot spans 5 of 7 periods of an undulator with y=z=0 μm at the center.

With respect to FIG. 8, the transverse magnetic flux density is plotted at different positions for Design 2 of FIG. 1, with period $\lambda_u=100$ μm, and gap g=50 μm. The plot spans 5 of 7 periods of an undulator with y=z=0 μm at the center.

Thermal issues pose significant issues for conventional undulators. In particular, heat extraction can pose a serious challenge when operating electromagnetic undulators under vacuum. Further aggravating heat extraction from the undulator is the reduced cross section of the windings as the undulator period scales down, driving up both current density and coil resistance.

Further, the amount of MMF that may be generated for a given period of the undulator may be limited by the maximum allowed current density through the undulator coil before a threshold operating temperature is reached, beyond which the operation of the undulator may be significantly degraded and/or the undulator may be physically damaged. For certain embodiments described herein, the threshold operating temperature of the undulator (which may be the maximum operating temperature) may be reached when the magnetic material passes the Curie temperature, the internal stress of the magnetic material increases significantly due to annealing, or the polymer used to isolate the windings from the magnetic yoke decomposes.

For example, where the alloy $Co_{65}Ni_{12}Fe_{23}$ is used, the curie temperature is typically in excess of 800° C. The internal stress of magnetic alloys containing Ni and Fe anneal to high stress in excess of 250° C., and a polymer, such as SU-8, decomposes in vacuum at 280° C., setting a threshold upper limit operating temperature of about 250° C. for such an embodiment.

Where silicon (Si) is used as the undulator substrate, heat transport from the electromagnet through the substrate may be limited at least in part by the thermal conductivity of Si (e.g., to 65 W/cm² for a 200 μm thick substrate). At 10 kW/cm², 150° C. of the thermal budget is consumed in a 200 μm Si substrate. The thickness of the bottom and top winding layers may be increased to improve heat transport and reduce Joule heating in the electromagnet using a damascene and through-mold electroforming process, respectively, but the cross section of the vias may be limited by the available space between the magnetic yokes.

Figure 4:
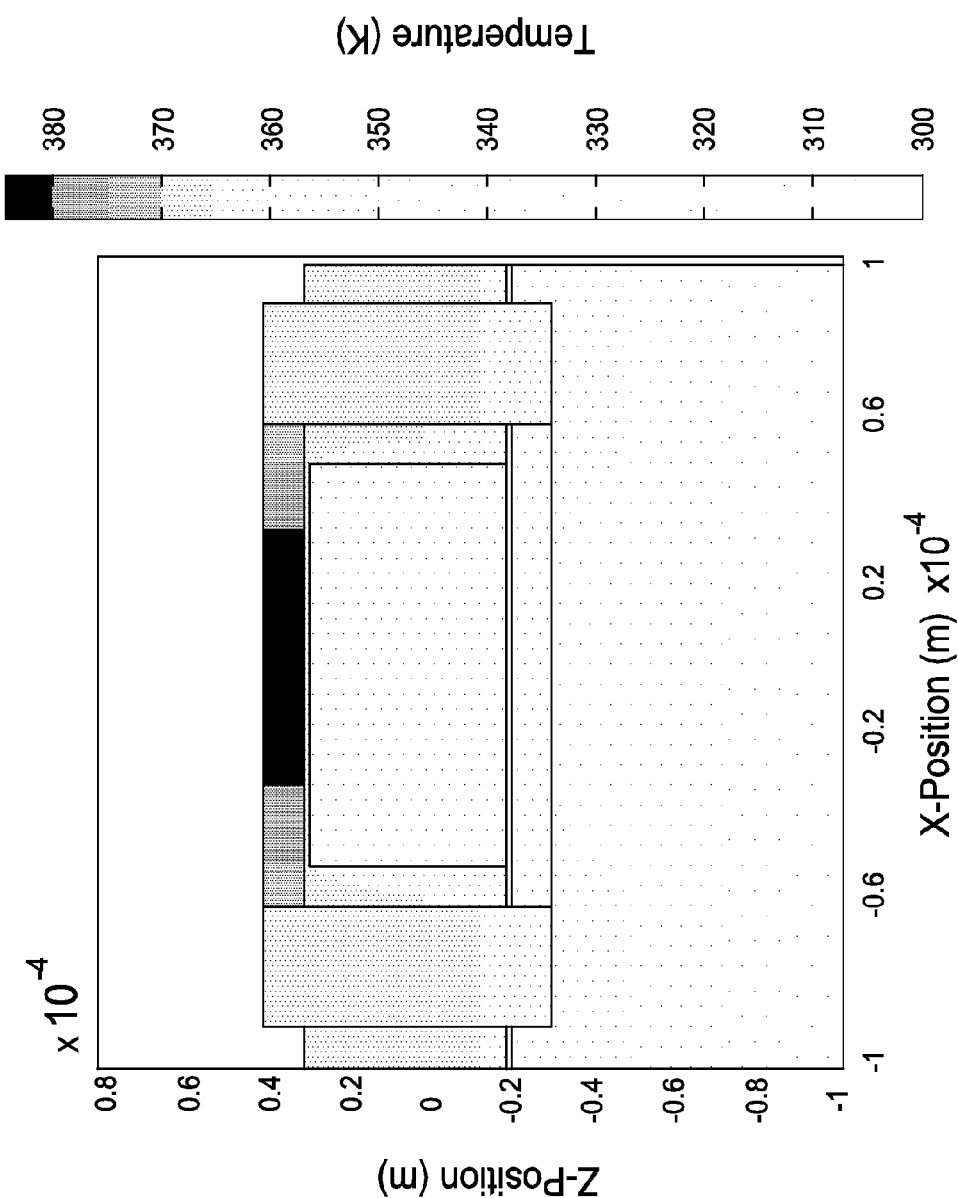
FIG. 4 illustrates an example undulator temperature distribution when driven with a first drive current.

Depending on the geometry, in certain example embodiments the undulator dissipates 100 s of W/cm² to 10 s of kW/cm² during operation. For an example saturated 400 μm period undulator with a magnetic gap of about 50 μm, 3820 W/cm² needs to be extracted from the undulator to maintain a steady-state temperature. FIG. 4 illustrates the 2D temperature distribution simulated using Comsol Multiphysics across a 50 μm tall winding cross section of a $\lambda_u=400$ μm undulator on a 200 μm thick silicon wafer. Here, the base of the wafer needs to be held at less than about 138° C. to keep the structural polymer from exceeding a safe temperature of 250° C. FIG. 5 illustrates the simulated temperature distribution across a 25 μm tall winding cross section of $\lambda_u=100$ μm undulator on a 200 μm thick silicon wafer. Here, the base of the wafer is to be held at less than about 32° C., which is about room temperature.

For geometries that generate more surface heat density, conductive heat transfer from room temperature is not sufficient to keep the undulator below the structural polymer's decomposition temperature. To address this limitation, the structural polymer may be etched away (e.g., in $O_2$ plasma) prior to operation, the undulator is run pulsed, or a circulating liquid or cryogenic cooler may be used to extract heat from the undulator. Given the τ=100 ns-100 μs response of the undulator inductors in certain embodiments, pulsed operation at 1 kHz with a 10% duty cycle would allow all undulator designs to be driven with the substrate held at room temperature. Integrated two-phase microjet impingement cooling may also be utilized to greatly increase heat transport allowing continuous wave operation without cryogenic cooling.

Figure 3:
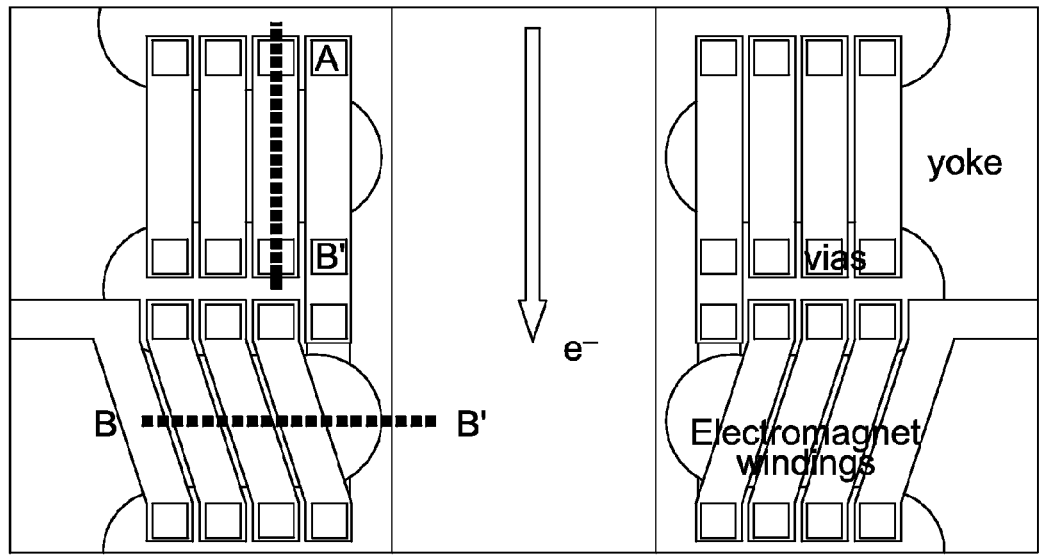
FIG. 3 illustrates an example undulator fabrication process.
Figure 3:
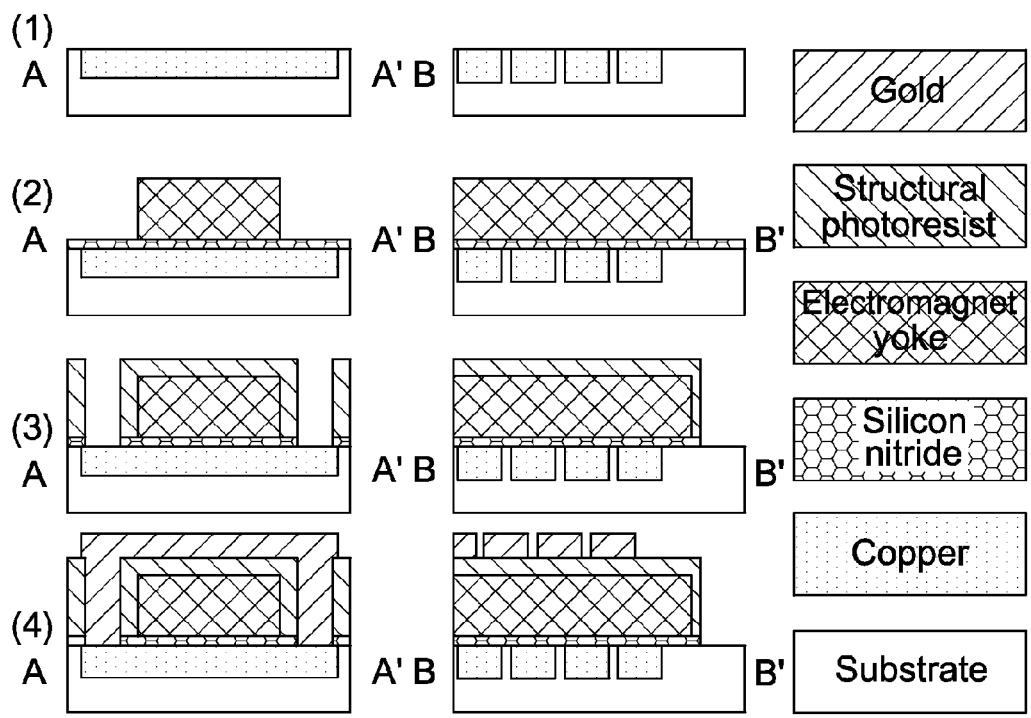

Example undulator fabrication processes will now be described with reference to FIG. 3. It is understood that not all processes need to be performed, and the processes do not necessarily need to be performed in the described order. Further, it is understood that the geometries and dimensions provided herein are to illustrate certain example embodiments, and that other geometries and dimensions may be used. Further, while certain example fabrication tools and materials are described for illustrative purposes, other fabrication tools and materials may be used. It is understood that the film thickness illustrated in FIG. 3 are not to scale, for the sake of clarity. Optionally, the fabrication process may include a microsolenoidal electromagnet fabrication process.

At state (1), the pattern for the bottom coil windings is photo-lithographically defined on a high-resistivity silicon wafer (although, as discussed above, other substrates may be used instead of silicon). Optionally, a sacrificial high-aspect-ratio negative-tone photoresist is used (e.g., about 5 μm thick) to provide a soft mask. Using this soft mask, 10 μm trenches are anisotropically etched in the silicon wafer (e.g., using the Bosch process with a deep reactive ion etcher). The photoresist is removed in an organic photoresist stripper and the wafer surface is cleaned in an $O_2$ plasma stripper. An insulating layer (e.g., a 100 nm insulating layer of silicon nitride) is deposited by inductively coupled plasma enhanced chemical vapor deposition to isolate the bottom windings from the silicon substrate.

An electroforming seed is deposited on the surface of the silicon nitride (e.g., by RF sputtering with a 20 kV DC bias to provide adequate coverage over the 10 μm wafer topology). Optionally, the seed layer comprises about 30 nm of titanium to provide adhesion to the substrate, about 300 nm of copper to carry the electroplating current and compatibility with copper electroplating, and about 30 nm of titanium to protect the copper from oxidation. The exposed seed layer is etched to copper (e.g., in a 1% hydrofluoric acid) and a copper film (e.g., about 12 μm thick) is electroplated from a phosphorized copper anode in a sulfate based solution. The film may be polished back down to the silicon surface, yielding the bottom of the electromagnet winding pattern. An insulating layer (e.g., a 300 nm insulating layer of silicon nitride) is deposited by inductively coupled plasma enhanced chemical vapor deposition to isolate the bottom windings from the conductive magnetic yoke.

At state (2), an electroforming seed is deposited by sputtering on the surface of the silicon nitride. The seed layer in this example includes about 30 nm of titanium to provide adhesion to the substrate, 300 nm of copper to carry the electroplating current and provide a surface compatible with magnetic alloy (e.g., NiFe, CoNiFe, or CoNiP) electroplating, and about another 30 nm of titanium to protect the copper from oxidation before plating and to provide adhesion between the metal and the electroplating mold.

A film of high sidewall-aspect-ratio negative tone photoresist (e.g., having a thickness of about 60 μm) is photolithographically patterned into the geometry of the magnetic yoke. The exposed seed layer is etched to copper (e.g., in a 1% hydrofluoric acid), and the magnetic alloy that forms the electromagnet yoke is electroplated through the mold using the process.

The mold is removed by delamination (e.g., after soaking about 8 hours in heated organic photoresist stripper). The electroplating seed is stripped by consecutive dips in acid (e.g., in 1% hydrofluoric acid, a mixture of 5% acetic acid and 15% hydrogen peroxide, and 1% hydrofluoric acid.

At state (3), a layer of structural photoresist (e.g., about a 55 μm thick layer) is spun on the wafer to isolate the conductive magnetic yoke from the top layer of the coil windings. The photoresist is patterned using photolithography to define the coil winding interconnects and the electron-beam path is annealed under vacuum (e.g., for about 8 hours at about 230° C.). The silicon nitride covering the copper at the base of the vias is etched with an inductively coupled plasma (e.g., a $CF_4$ plasma) to expose the bottom windings of the coil. A single damascene process may be used, where first the windings are fabricated and then the vias are filled, or a dual damascene process may be used, where the vias are filled at the same time the windings are fabricated.

At state (4), another electroforming seed is sputtered on the surface, and a negative-tone photoresist electroplating mold is patterned into the geometry of the top layer of the electromagnet coil windings. Gold is electroplated (e.g., from a potassium aurocyanide bath heated to 55° C. with strong agitation from a platinized titanium anode through the photopatterned mold) to complete the electromagnet coil windings. The mold and electroplating seed are stripped using the process described above, completing the undulator solenoids. Additional processing steps may be utilized (e.g., for integration with an electron beam line). To carry image current, the gap defined by the thick structural photoresist can be covered with a layer of metal by sputtering or electron beam evaporation. The windings can be protected from electrical shorts during this metal deposition by either a sacrificial patterned photoresist or a thin film of silicon nitride.

Thus, described herein are undulators, embodiments of which provide very short wavelength, monochromatic emission (e.g., X-ray region, 0.1-0.5 A°, UV region, 10 nm to 400 nm, etc.) using a relatively low-energy electron beam source (e.g., E_beam=about 200-500 MeV, although higher or lower energy electron beam sources may be used). Certain embodiments provide a high current density and present low inductance (e.g., 1-100 μH per centimeter of undulator length) to a driving circuit, enabling the undulator to be pulsed with a much shorter duty cycle, (e.g., 0.01% to 1%), than conventional undulators. The optical wavelength and output power of these devices can be tuned in-situ across several orders of magnitude by electrically modifying the undulator parameters and/or electron beam characteristics, making a widely tunable laser source. Certain embodiments require no ancillary equipment needed by conventional devices and can operate across a wide range of temperatures and radiation conditions, although other embodiments may utilize such ancillary equipment. Applications include, but are not limited to, upcoming phase contrast X-Ray medical imaging, a fast and portable imaging modality with high contrast to sift tissues, surgery, time resolved chemical reactions, used academically to gain insight into the fundamentals of chemistry and currently carried out by national accelerator facilities, and coherent X-ray diffraction imaging, used to map the structure of biological compounds used by the pharmaceutical industry. Further, example embodiments may be utilized in high average power spontaneous emission source, and may be utilized with ultrahigh-brightness electron beams to provide low energy compact free-electron lasers.

Various aspects and advantages of the embodiments have been described where appropriate. It is to be understood that not necessarily all such aspects or advantages may be achieved in accordance with any particular embodiment. Thus, for example, it should be recognized that the various embodiments may be carried out in a manner that achieves or optimizes one advantage or group of advantages as taught herein without necessarily achieving other aspects or advantages as may be taught or suggested herein. Further, embodiments may include several novel features, no single one of which is solely responsible for the embodiment's desirable attributes or which is essential to practicing the systems, devices, methods, and techniques described herein. In addition, various features of different embodiments may be combined to form still further embodiments.

What is claimed is:

1. An electromagnetic undulator, comprising:
   a substrate;
   an electromagnetic structure formed on the substrate,
     the electromagnetic structure having at least a yoke and a first plurality of yoke poles integral to the yoke; and
     selectively powerable windings around each yoke pole in the first plurality of yoke poles enabling a winding drive current for each yoke pole in the first plurality of yoke poles to be independently tuned,
   wherein yoke poles in the first plurality of yoke poles are magnetized in-plane with the substrate,
   wherein the electromagnetic undulator has a period not greater than about 5 mm and not less than about 5 μm.

2. The electromagnetic undulator as defined in claim 1, wherein the yoke has a thickness and a yoke gap, wherein the ratio of the yoke gap to the yoke thickness is less than or equal to 10:1.

3. The electromagnetic undulator as defined in claim 1, wherein the electromagnetic undulator has a period in the range of about 10 μm to about 100 μm.

4. The electromagnetic undulator as defined in claim 1, wherein the electromagnetic undulator has a period in the range of about 300 μm to about 400 μm.

5. The electromagnetic undulator as defined in claim 1, wherein the electromagnetic undulator has a period in the range of about 400 μm to about 800 μm.

6. The electromagnetic undulator as defined in claim 1, wherein the independently controllable windings are metal windings.

7. The electromagnetic undulator as defined in claim 1, further comprising surface-micromachined solenoidal soft micro-magnets.

8. The electromagnetic undulator as defined in claim 1, wherein the electromagnetic undulator has an optical wavelength and output power tunable over a plurality of orders of magnitude by selectively changing drive current in one or more of the independently controllable windings.

9. The electromagnetic undulator as defined in claim 1, wherein the electromagnetic undulator is configured to generate a magnetic flux on only one side of an undulator axis.

10. The electromagnetic undulator as defined in claim 1, wherein the electromagnetic undulator does not require cryogenic cooling for operation.

11. A method of fabricating an electromagnetic undulator, the method comprising:
   defining a pattern for bottom coil windings on a substrate;
   depositing an insulating layer over the substrate;
   depositing a seed layer;
   electroplating a magnetic alloy layer over the seed layer to form an electromagnetic yoke;
   forming a photoresist layer over the electromagnetic yoke;
   patterning the photoresist layer to define coil winding interconnects; and
   electroplating metal over the coil winding interconnects to form, at least in part, a plurality of selectively powerable bottom coil windings.

12. The method as defined in claim 11, the method further comprising using a damascene process in forming the plurality of individually controllable bottom coil windings.

13. The method as defined in claim 11, the method further comprising stripping at least a portion of the seed layer.

14. The method as defined in claim 11, wherein the seed layer comprises copper and titanium.

15. The method as defined in claim 11, wherein the magnetic alloy comprises NiFe, CoNiFe, or CoNiP.

16. The method as defined in claim 11, wherein the electromagnetic undulator has a period in the range of about 5 μm to about 5 mm.

17. The method as defined in claim 11, wherein the electromagnetic yoke has an associated gap in the range of about 10 μm-400 μm across.

18. A free electron laser system, comprising:
   a particle accelerator;
   an electromagnetic undulator in operative arrangement with the particle accelerator, the electromagnetic undulator comprising:
      a substrate;
      an electromagnetic structure formed on the substrate, the electromagnetic structure having at least a yoke and a first plurality of yoke poles integral to the yoke; and
      selectively powerable windings around each yoke pole in the first plurality of yoke poles enabling a winding drive current for each yoke pole in the first plurality of yoke poles to be independently tuned,
   wherein yoke poles in the first plurality of yoke poles are magnetized in-plane with the substrate,
      wherein the electromagnetic undulator has a period not greater than about 5 mm and not less than about 5 μm.

19. The free electron laser system as defined in claim 18, wherein the particle accelerator has a length in the range of 2 cm to 10 cm.

20. The free electron laser system as defined in claim 18, wherein the particle accelerator has an output no greater than 500 MeV.

21. The free electron laser system as defined in claim 18, wherein the particle accelerator is a laser-plasma Wakefield accelerator.

* * * * *